(12) United States Patent
Imhof et al.

(10) Patent No.: US 6,214,491 B1
(45) Date of Patent: *Apr. 10, 2001

(54) METALLIZED FIBER STRUCTURE FRAMEWORK HAVING TREATED EDGE SURFACES AND FACES FOR USE AS AN ELECTRODE OR RECOMBINATION ELEMENT IN ACCUMULATORS

(75) Inventors: Otwin Imhof, Nürtigen; Holger Kistrup, Esslingen; Dieter Henke; Wilhelm Kitzhöfer, both of Brilon; Uwe Schaffrath, Korbach, all of (DE)

(73) Assignee: Deutsche Automobilgesellschaft mbH, Braunschweig (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,733

(22) Filed: May 28, 1997

(30) Foreign Application Priority Data

May 28, 1996 (DE) .............................. 196 21 316

(51) Int. Cl.⁷ .................................................. H01M 4/74
(52) U.S. Cl. ......................... 429/211; 429/234; 429/235
(58) Field of Search ................... 429/142, 233, 429/211, 234, 209, 235

(56) References Cited

U.S. PATENT DOCUMENTS

| | | | |
|---|---|---|---|
| 2,616,165 | * | 11/1952 | Brennan ........................ 429/234 X |
| 2,834,825 | * | 5/1958 | Wenzelberger ................ 429/234 X |
| 3,556,855 | * | 1/1971 | Howells ........................... 429/234 |
| 4,748,096 | * | 5/1988 | Imhof . |
| 4,755,441 | * | 7/1988 | Imhof et al. . |
| 5,156,899 | * | 10/1992 | Kutrup et al. . |

FOREIGN PATENT DOCUMENTS

| | | |
|---|---|---|
| 3631055 | 9/1986 | (DE) . |
| 3632351 | 9/1986 | (DE) . |
| 3632352 | 9/1986 | (DE) . |
| 3637130 | 10/1986 | (DE) . |
| 3817826 | 5/1988 | (DE) . |
| 3817827 | 5/1988 | (DE) . |
| 3822197 | 7/1988 | (DE) . |
| 4004106 | 2/1990 | (DE) . |
| 4010811 | 4/1990 | (DE) . |
| 4040017 | 12/1990 | (DE) . |
| 4103546 | 2/1991 | (DE) . |

* cited by examiner

Primary Examiner—John S. Maples
(74) Attorney, Agent, or Firm—Evenson, McKeown, Edwards & Lenahan, P.L.L.C.

(57) ABSTRACT

The invention provides a treatment for edge surfaces and faces of metallized fiber structure framework plates for use in electric accumulators. The edge surfaces and faces, except for the starting portion of the current tapping tab, are mechanically, thermally or chemically freed of projecting metallized fiber ends and fiber bundles in order to avoid short circuits or soft shorts caused by dendrites penetrating the cell separator or by metallized fiber ends. The mechanical, thermal or chemical treatments can take place individually or in combination with one another.

6 Claims, 4 Drawing Sheets

METALLIZED FIBER STRUCTURE FRAMEWORK HAVING TREATED EDGE SURFACES AND FACES FOR USE AS AN ELECTRODE OR RECOMBINATION ELEMENT IN ACCUMULATORS

This application claims the priority of German patent application No. 196 21 316.9, the disclosure of which is expressly incorporated by reference herein.

BACKGROUND AND SUMMARY OF THE INVENTION

The invention relates to fabricated porous metallized fiber structure framework plates for use as an electrode or recombination element (gas diffusion bodies) in electric accumulators, and to a process for manufacturing such plates.

Accumulators having a type of electrode made of a framework of metallized synthetic fibers, as well as different partial aspects or manufacturing steps therefor, are known from various patent publications:

German Patent Document DE-PS 40 04 106, for example, describes a nonwoven metallized synthetic-fiber electrode framework for battery electrodes, with an increased load capacity.

Processes for activation and chemical metallization of nonwoven and needle felt webs are disclosed in German Patent Documents DE-PS 36 31 055 and DE-PS 36 37 130.

German Patent Documents DE-PS 38 17 827, DE-PS 38 17 826 and DE-PS 40 10 811 disclose aqueous nickel hydroxide or cadmium oxide pastes for the vibration filling of foam and fiber structure electrode frameworks.

German Patent Document DE-PS 38 22 197 describes processes for continuous filling of fiber structure electrode frameworks, and for cleaning away excess paste from the electrode plate, preferably by means of brushes, after mechanical filling.

German Patent Document DE-PS 36 32 352 discloses a fiber structure electrode plate with a welded-on current tapping tab.

German Patent Document DE-PS 40 18 486 discloses a process for manufacturing fiber structure electrodes, in which the framework is calibrated before the filling, and is calibrated again afterward, by means of a whole-surface pressing-together.

German Patent Documents DE-PS 40 40 017 and DE-PS 41 03 546 respectively describe a process for filling fiber structure electrode frameworks for accumulators with an active-mass paste while simultaneously calibrating the framework; in the former, the framework is rolled during the filling operation, and in the latter, the plate is pressed during the filling operation.

Despite the intensive treatment of the topic which is of interest here and which is documented by the above-mentioned list (which is to serve only as an example, and is by no means complete), difficulties and inadequacies in fiber structure electrode plates which become apparent only during the operation of the cells, continue to occur. As a result of the cycle-dependent volume mainly of the positive electrodes and the separators, and the resulting displacement of the components with respect to one another due to charging and discharging, occasionally premature capacity losses of the accumulator will occur.

The manufacture of such fiber structure electrodes is based on a nonwoven made of synthetic fibers. According to experience, nonwovens and needle felts with starting porosities of from 45% to 96% with a fiber diameter of between 5 $\mu$m and 40 $\mu$m are particularly suitable for the manufacture of fiber structure electrodes and recombination elements with a metallic fiber structure. After chemical activation, wet-chemical metallizing and galvanic reinforcing of the metal coating, the pieces finished to this extent are cut to a useful size and the plates are provided with a current tapping tab on a portion of a dimensionally stable edge which is reinforced during the galvanizing and was left standing in areas. Before filling with the active mass, the fiber structure framework plates are calibrated in order to be able to manufacture electrode frameworks with a defined filling while the scattering is low.

During fabrication of the fiber structure framework plates, the fiber structure will fan out on the cut edges because of the separating, sawing or cutting. That is, the spatial fiber composite will be partly lost in the area of such cutting, etc., and individual fibers or fiber bundles may come to the surface already because of their inherent tension and may project from it more or less steeply. When the active mass is entered into the fiber structure framework by vibration filling, the fibers exposed in the cutting area are further relaxed because of the vibrations. By means of the vibrations and the active mass penetrating into the fiber structure, the fanning-out may be increased. A superficially adhering excess of active mass paste must then be mechanically removed, which also exacerbates the fanning-out of individual fibers from the fiber structure in the area of the cut edges. In this case, the ends of fibers which are not completely linked into the composite are occasionally torn out and may, under certain circumstances, even project from the electrode surface at a right angle.

Fiber structure framework plates of the type addressed here are used in the accumulator construction not only as positive or negative electrode plates (after the filling-in of the active mass), but also in the form of metallized fiber frameworks (not filled with an active mass) as a gas diffusion framework and recombination element on which the oxygen is reduced relatively rapidly. The gas diffusion frameworks should rest against the electrodes or against individual negative electrodes in a full-surface and electrically conductive manner. The recombination elements therefore do not require a current tapping tab. Also when fiber structure framework plates of this type are manufactured, individual metallized fibers may protrude from the flat side of the framework plate in a more or less steep fashion and can also not be pressed back permanently into the composite by means of a calibrating operation.

Such metallized fibers and fiber composites which are pulled up or spread out from the fiber composite would result in a certain failure rate of the cells, because of internal short circuits. For this reason, such interfering fibers are normally pushed back by means of another calibration after the filling and drying of the fiber structure electrodes and before the assembly to an accumulator. However, this technique represents another working step during which, because of a possible formation of dust as the result of the crushed dry active material, additional special workers' protection measures are necessary.

Despite the calibration of the (filled or unfilled) framework plates, afterwards individual fibers may still project from the flat side of the framework plate. During the combined mechanical stressing of the plate composite which occurs during the assembly of the different framework plates and separators to an accumulator, as a result of pressing directed transversely to the plates and a thrust directed in parallel to the layer construction, if unfavorable circumstances coincide, individual fibers may penetrate into the separators and may even penetrate through the thin separators to the opposite electrode plate. Moreover, mainly during the mounting of the current tapping tabs, stresses occur in the area of the starting portion of the current tapping tabs on the electrode plates, which promote such a piercing of individual fibers through the separators. In the dry condition of the freshly assembled cell, a possible subsequent short circuit can usually not yet be diagnosed or localized. However, after a few cycles during the formation, or more probably later in the accumulator operation, because of a constant volume change in the positives as the result of the charge and discharge operation or because of the expanding of the plate stack by the addition of electrolyte, a projecting fiber, at first hidden, may cause a failure of the cell because of a local short circuit. Even if a fiber itself may not have completely penetrated the separators after a certain number of cycles, needle-like, electrically conductive dendrites grow up from such local anomalies, and may penetrate the separators, leading to a short circuit.

It is an object of the invention to provide an improved fiber structure for framework plates which exhibits enhanced operational reliability, and eliminates or considerably reduces the danger of short circuits between electrode plates of different polarities due to superficially projecting, metallized fiber ends or fiber bundles and/or because of the formation of dendrites.

This object is achieved by the fiber structure framework plates according to the invention, in which the projecting fibers themselves are removed from the framework plates and/or their damaging influence is eliminated, by sealing the projecting fibers in an electrically insulating manner or embedding them into a mass. Surprisingly, it was found that such fiber structure framework plates can be treated by stress-intensive, mechanical, thermal or chemical process steps on their edge surfaces and faces, without any significant impairment of the fiber structure areas situated outside the treated edge surfaces and faces.

In conjunction with mechanical treatment of the edge surfaces and faces to eliminate projecting metallized fiber ends or fiber bundles, it is also particularly recommended that the otherwise interfering projecting fiber ends be integrated back into the framework composite already when the framework plates are cut to size, by a suitable selection of the cross-sectional shape of the cutting tool. This can be achieved by the use of chamfered cutting tools which are shaped similarly to those used in a punching process, move toward one another and perform the cutting to size from the two flat sides of the fixed framework.

Likewise, it is possible to cold-emboss or hot-emboss the edge surfaces and faces of the metallic framework without any lasting damage to its areas which are away from the edge surfaces and faces, in order to obtain bevels at the upper and lower edges of the framework (except at the starting portion of the current tapping tabs). Such bevels also prevent fibers from projecting at the framework edge, which later during accumulator operation could be preferred starting points for the growth of dendrites, with a subsequent separator perforation.

Also by applying a hot-melt-type adhesive or bonding agent to the edge surfaces or faces of the fiber framework (except for the starting portion of the current tapping tab), the metallic surfaces of fibers or fiber bundles projecting there can be electrically insulated, thereby effectively preventing them from creating inhomogeneities in the electric field and generating voltage peaks. By coating projecting fiber ends or fiber bundles with a polymer layer, for example, a bonding agent or a hot-melt-type adhesive, the exposed fiber tip is blunted and the fiber ends or fiber bundles are therefore deprived of their perforation force with respect to the separator. In this case, it was found to be advantageous to apply mechanical pressure to the edge surface or face (except at the current tapping tab), immediately after the coating with the adhesive or bonding agent, until the adhesive or the bonding agent is hardened or dried. In the process, after the application of the adhesive or bonding agent, the face or edge surface of the fiber structure framework plates can be moved under pressure in a rotating manner from one plate edge to the other.

Another aspect of the invention consists of locally heating the faces and edge surfaces (except at the current tapping tabs) to such an extent that the cores of the projecting fiber ends or fiber bundles will melt, and the molten plastic emerging from the metal covering will seal the fiber ends in the form of a molten bead. At the same time, to melt the fiber cores, it is recommended that pressure be applied on the edge surface or face of the framework (except at the starting portion of the current tapping tab) in order to integrate the projecting fiber ends or fiber bundles with the reduced stiffness back into the fiber framework composite. Also in this case, pressure can advantageously be applied on the edge surface and face of the framework, by a back-and-forth rotating or rolling movement of the whole framework on a firm base.

In an expedient further embodiment of the invention, the edge surfaces and faces of the fiber structure framework (except at the starting portion of the current tapping tab), can be subjected to a resistance welding. In the course of resistance welding fibers projecting from the framework edges, on the one hand, are deformed locally by the effect of pressure and temperature, so that they are integrated back into the fiber structure composite of the other fibers. However, on the other hand, simultaneously the edge of the fiber structure framework is permanently deformed as well as compressed.

Naturally, the above-mentioned processes for treating fiber structure framework plates of the above-mentioned type can be combined with one another. It is not absolutely necessary to use the different treatment methods simultaneously as in the above-mentioned example of the resistance welding, but these treatment methods may also be applied successively in a time-staggered manner. For example, the edge of the metallized fiber structure can be mechanically deformed in a first step in order to then be acted upon by a bonding agent or hot-melt-type adhesive for an additional protection against the growth of dendrites. Likewise, the edge can essentially already be freed of projecting fiber ends by a local heating, after which it can be coated in a second step with a bonding agent or hot-melt-type adhesive. It is particularly recommended, although not essential, to treat the plate edge before the filling with an active mass.

The advantages of the invention consist of two effects: On the one hand, as a result of the edge treatment of the metallized textile fiber structure frameworks, dimensional accuracy of the electrode plates or gas diffusion bodies to be built into the cell is improved. This results in a number of favorable effects in conjunction with a uniform pressure onto the electrode surfaces during the expansion and shrinkage processes while the accumulator is charged and discharged. Secondly, specifically in the case of cells with a negative mass which has the strong tendency to precipitate dendrites, such as cadmium or zinc, the growth of dendrites is effectively prevented or delayed. As illustrated by means of the following example, the number of statistical failures of a comparison group of FNC accumulators with the edge treatment of the fiber structure frameworks according to the invention is clearly reduced in contrast to a comparison group of corresponding FNC accumulators without the edge treatment according to the invention. If it is considered that the life of an FNC accumulator statistically can be increased by up to 15% by the application of the invention, the additional costs of the edge treatment are definitely justified.

Other objects, advantages and novel features of the present invention will become apparent from the following detailed description of the invention when considered in conjunction with the accompanying drawings.

DETAILED DESCRIPTION OF THE DRAWINGS

Figure 1A:
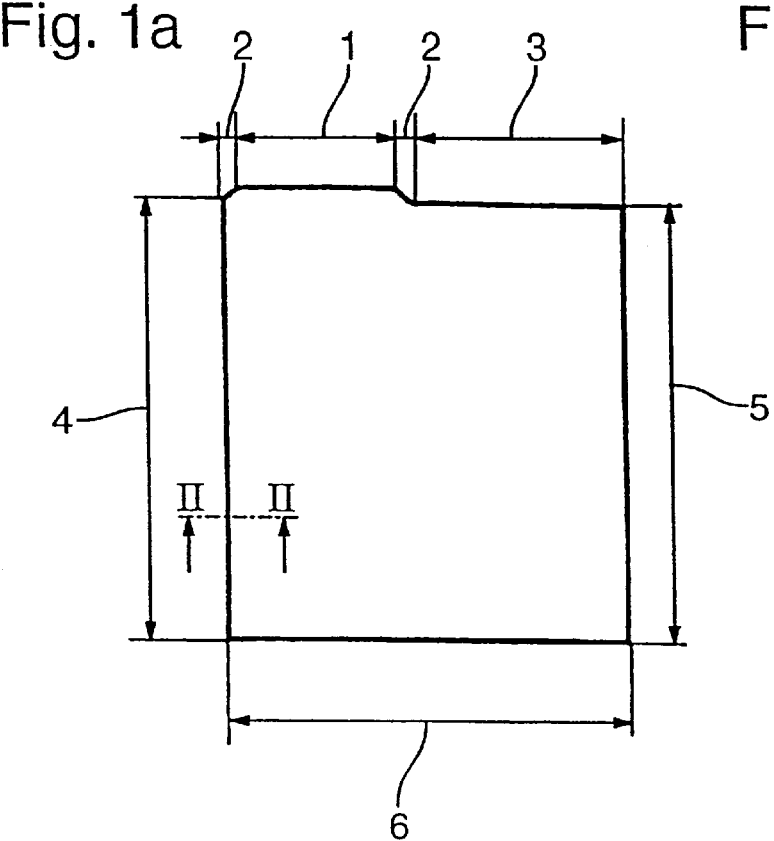
FIG. 1a is a top view and FIG. 1b is a lateral view of a metallized fiber structure framework plate which can be further processed to form an electrode.
Figure 1B:

FIGS. 1a and 1b show a conventional fiber structure framework plate which can be processed into an electrode. In these figures, the edge surfaces and faces have the following reference numbers:

1 starting portion of the current tapping tabs,
2 two bevels toward the starting portion 1;
3 upper edge,
4 left edge,
5 right edge,
6 lower edge,
7 thickness of the fiber structure framework plate (FIG. 1b).

The starting portion 1, to which current tapping tabs are welded in a conventional manner, is not to be treated according to the invention. Conventional dimensions for the lateral edges 4, 5 (height) are, for example, 100 to 250 mm; for the edge 6 (width), they are normally 100 to 200 mm. The thickness 7 may be from 0.5 mm to 10 mm.

Figure 2:
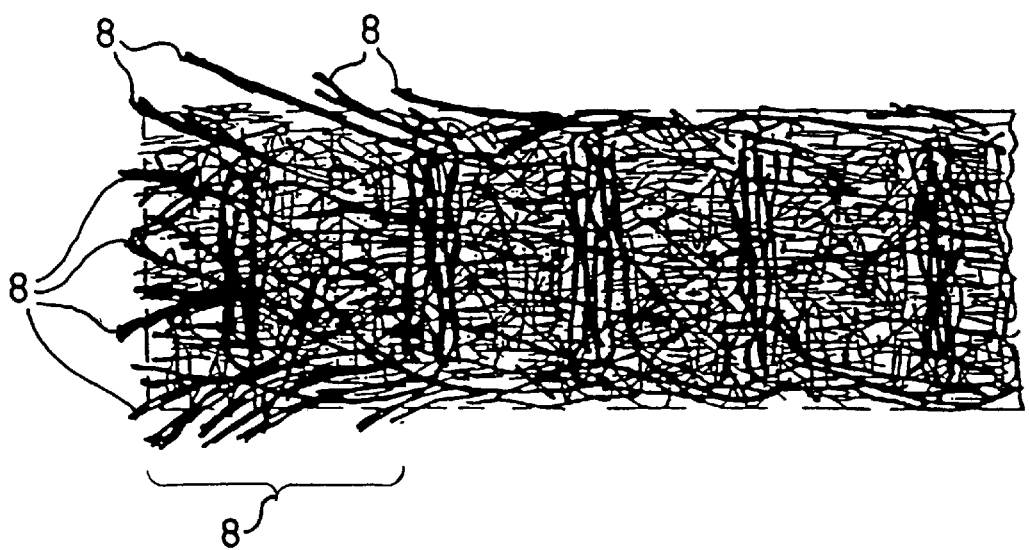
FIG. 2 is a cross-sectional view along section line II—II in FIG. 1 of the edge of a metallized untreated fiber structure framework plate.

FIG. 2 is a cross-sectional view of the edge of a metallized untreated fiber structure electrode framework. Free fiber ends and fiber bundles 8 project from the composite of the metallized fiber structure and may therefore, under certain circumstances, penetrate a narrowly surrounding separator. In a predominant manner, metallic dendrites may also grow up from these fiber tips which will then later in the cell operation make the separator partially ineffective because of perforation.

Figure 3A:
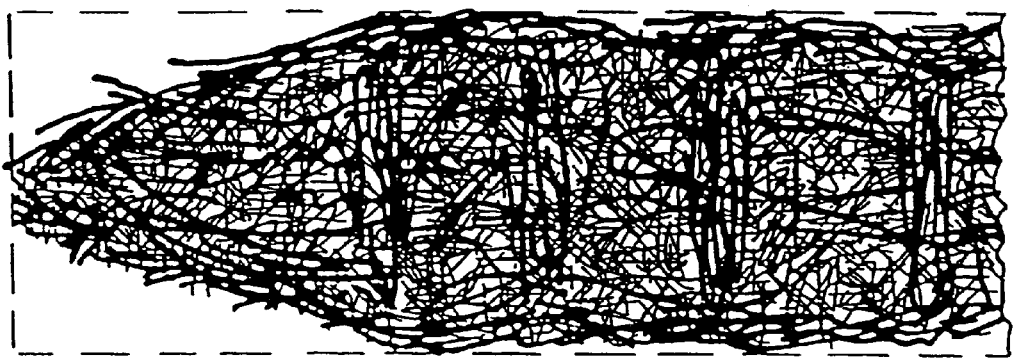
FIGS. 3a and 3b are cross-sectional views of the edge of a fiber structure plate aftertreated by embossing, in the case of FIG. 3a the edge changing in an edged manner into an embossed edge bevel and in the case of FIG. 3b, the edge changing in a rounded manner into an edge embossing.
Figure 3B:
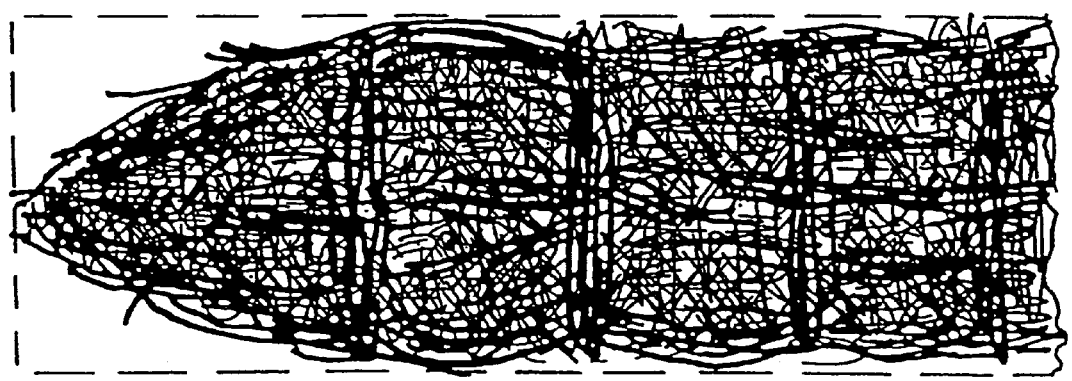

FIGS. 3a and 3b show how the fiber structure framework plate was freed of projecting fiber ends or fiber bundles in the aftertreated edge by embossing the edge into two different cross-sectional shapes. In FIG. 3a, a diagonal edge embossing changes into the flat side of the framework plate, whereas, in FIG. 3b, the flat side changes in a rounded fashion into an edge embossing. As a result of the plastic deforming energy entered during the embossing, projecting fiber ends and fiber bundles no longer project beyond the plane of the main surfaces (thickness) of the electrode, even in the case of a later vibration filling of the fiber structure electrode with an active mass in the embossing area. The embossing of the edge surfaces and faces according to the invention also prevents the fiber ends or fiber bundles being brought once again into a projecting position when, after the filling operation excess mass is brushed off the electrode framework.

Figure 4:
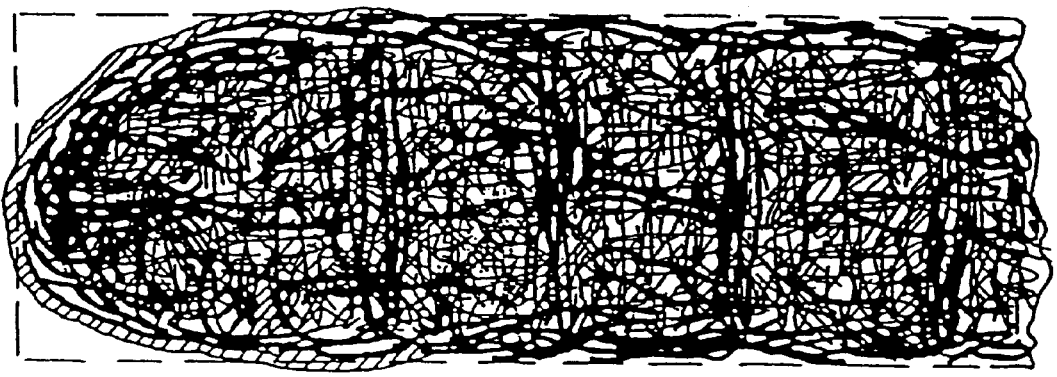
FIG. 4 is a cross-sectional view of the edge of a metallized, aftertreated fiber structure framework plate, in which the edge is mechanically deformed by pressure and temperature and is coated with a bonding layer.

FIG. 4 shows an edge cutout of an aftertreated metallized fiber structure electrode framework, in which the edge was deformed by the simultaneous effect of pressure and temperature. In this case, it is necessary to heat the edge surfaces and faces of the fiber structure electrode framework to above the melting point of the plastic carrier. If the edge surfaces and faces during the embossing are heated above the melting point of the synthetic fiber core, the bending stiffness of the remaining hollow metal fiber is also considerably reduced, which automatically significantly promotes the reintegration of projecting fiber ends or fiber bundles at the edge surfaces and faces into the metallic fiber composite. The melting plastic emerges form the projecting fiber ends and fiber bundles in the form of a molten bead or molten skin and seals them on their ends. As the result of the simultaneous application of pressure by the embossing tool, these fiber ends and fiber bundles are pressed back into the metallized fiber framework and are virtually glued into it. The same effect can be achieved by applying a hot-melt-type adhesive or bonding agent after the embossing operation with a simultaneous heating.

Advantageously, the above-described approach can also be applied to fiber structure electrodes filled with an active mass. In this case, the preformed faces and edge surfaces of the electrode are to be provided with a bonding agent or hot-melt-type adhesive which simultaneously connects the separators resting on the flat sides of the positive or negative electrodes with the electrode plates.

Figure 5:
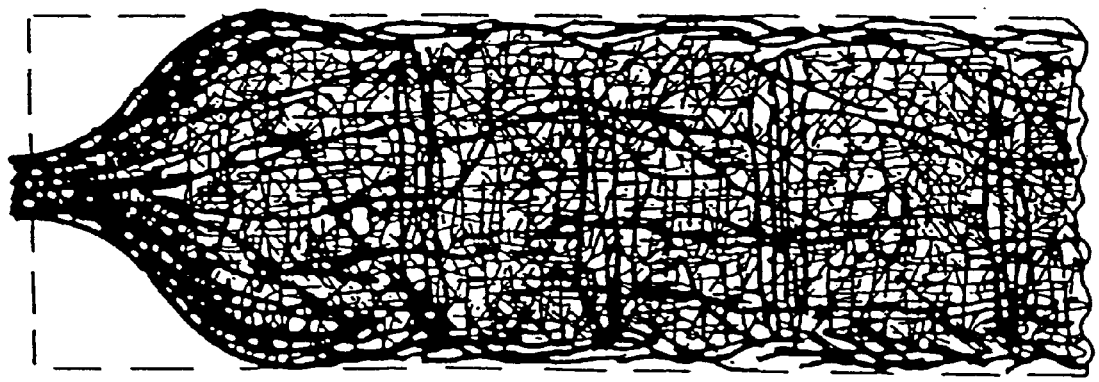
FIG. 5 is a cross-sectional view of the edge of a metallized aftertreated fiber structure framework plate in which the edge is resistance welded by means of structure welding electrodes.

FIG. 5 shows the edge cutout of a metallized fiber structure electrode framework aftertreated according to the invention whose edge surfaces and faces were subjected to resistance welding with structure welding electrodes. The simultaneous application of high pressure and high temperature during the welding operation compresses the edge surfaces and faces of the fiber structure electrode framework to a fraction of the original thickness, and the latter is thus permanently deformed. Simultaneously, the melting plastic is for the most part evaporated and the remaining hollow metal fiber ends metallically melt together with one another. The technical solution would, for example, be a rolling seam resistance welding by means of an automatic machine.

Figure 6:
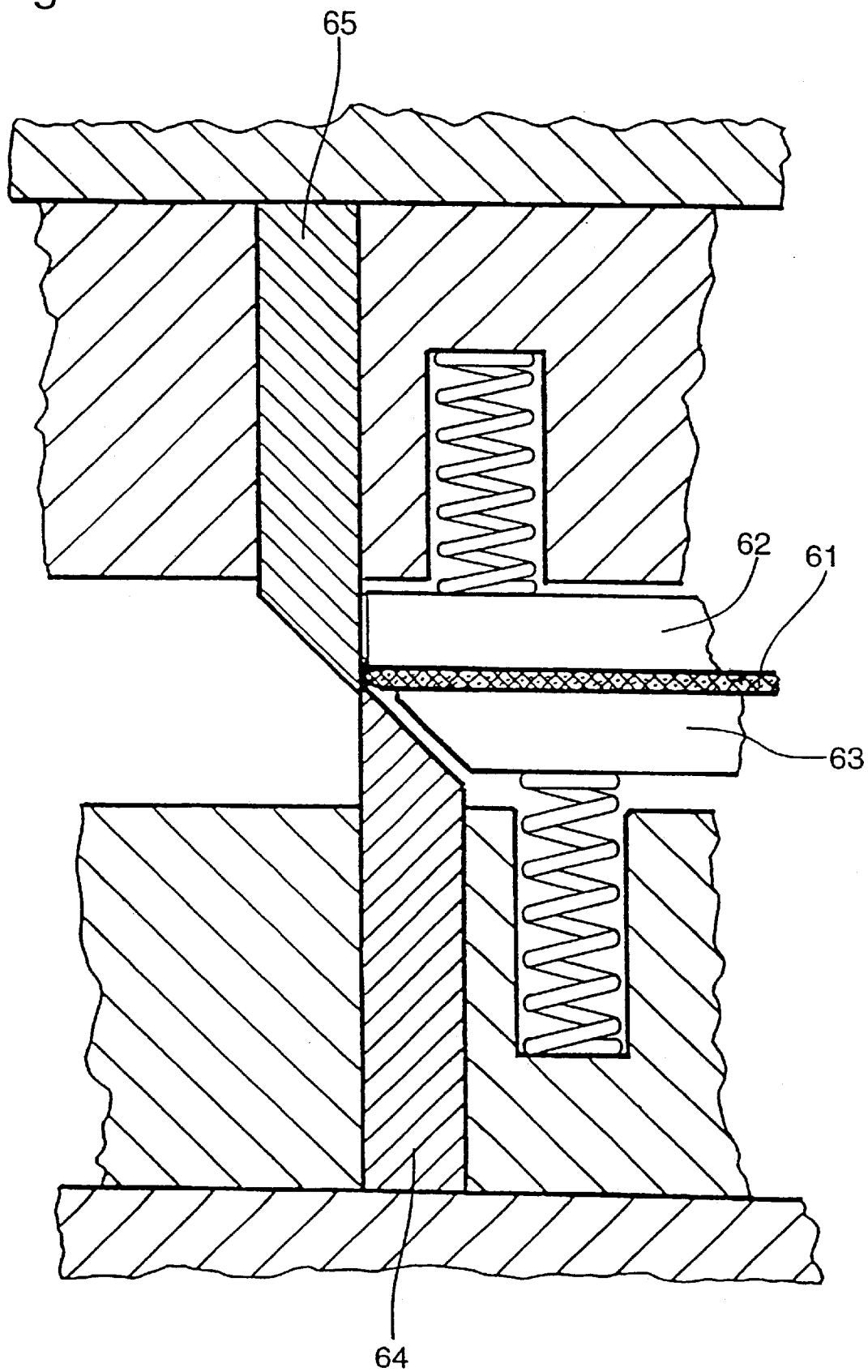
FIG. 6 is a schematic cross-sectional view of a cutting tool for form-cutting of fiber structure framework plates.

FIG. 6 is a schematic cross sectional view of a cutting tool suitable for cutting a fiber structure electrode framework to size. The metallized fiber structure web 61 is clamped flatly between the holding-down devices 62 and 63. Two cutting blades 64 and 65, which move simultaneously from above and below toward one another in the manner of blanking blades, cut the later fiber structure electrode framework to size. As a result, according to the invention, the obtained edge surfaces and faces receive a special shaping. On their guiding side extending in the lifting direction, the upper and lower cutting blades move past one another without play. The blade angle of the upper and lower cutting blade is approximately 45°. (This angle should be in the range of from 16 to 60°.) As a function of the thickness of the fiber structure electrode frameworks to be cut, it was found to be advantageous for the cutting edge of the cutting blade to be slightly rounded and to have a radius within a range of from 0.1 to 3 mm, preferably 0.2 mm. In this case, the smaller radii of the roundings apply to thin framework plates and the larger radius values apply to thicker plates. In a supporting fashion, the cutting blade can be heated to a temperature of from 200° C. to 300° C. in order to thermally free the plastic material within the metallized fiber structure, whose melting point is between 100° C. and 180° C., at the edge surfaces and faces of the plates from projecting fiber ends and fiber bundles. This approach can also be applied to fiber structure electrode frameworks filled with an active mass, in which case the dust or particles of the active mass which may occur during the cutting operation are removed by a suitable suction device.

A comparative example described in the following compares the advantages of the invention with the prior art: Two comparative series of fifty FNC cells respectively of the XX-45 type were mounted dry (without an electrolyte filling). The two test series of cells differ in that in one test lot, the edge surfaces and faces of the fiber structure electrode framework were embossed according to the invention before the filling with the active mass; whereas, in the other test lot, the fiber structure electrodes were mounted in the cells in a conventional manner without the use of the invention. A short-circuit test on the respective evacuated cells showed that, in the case of the cells with the embossed edge surfaces and faces treated according to the invention, not a single cell had a measurable short circuit in this condition. In the case of the cells with the untreated edge surfaces and faces, however, a total of 4% of the cells had a measurable short circuit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A porous framework plate for an electrode or recombination element in an electric accumulator, comprising:

a piece of metallized fiber material made of synthetic fibers which are intrinsically electrically non-conductive and have a metal coating, said material being selected from the group consisting of a nonwoven material and a needle felt, and being cut to a predetermined size for said electrode or recombination element, said predetermined size being defined by edges including an edge area for attachment of a current tapping tab;

wherein, to alleviate failures of said electrode or recombination element due to possible metallized fibers projecting from edge areas of the framework plate and possible growth of dendrites, substantially all remaining edge areas of said framework plate outside of said edge area for attachment of a current tapping tab, are characterized by compression of edge areas thereof relative to surfaces of said frame work plates outside said edge areas.

2. The framework plate according to claim 1 wherein a compressed edge area of the framework plate has a triangular cross section, and a bevel embossed on the edge area forms a corner at a locus of a transition of the edge area to a substantially flat surface of the framework plate.

3. The framework plate according to claim 1 wherein a compressed edge area of the framework plate has a pointed-arch-shaped cross-section, and an edge shape on at least one side which is substantially cylindrical, changing tangentially into a substantially flat surface of the framework plate.

4. The framework plate according to claim 1 wherein an edge area of the framework plate has an approximately symmetrical cross-sectional shape, with opposing sides having an approximately S-shaped cross-sectional contour.

5. The framework plate according to claim 1 wherein:

porosity of the nonwovens or needle felts before filling with an active mass is between 45 and 96%;

fiber diameter is between 5 and 40 $\mu$m;

thickness of the nonwovens or needle felts is between 0.5 and 10 mm; and weight per unit area of the non-metallized nonwoven or needle felt is between 50 g/m$^2$ and 800 g/m$^2$.

6. The framework plate according to claim 5 wherein porosity of the framework plate filled with an active mass and used as an electrode is between 15 and 40%.

* * * * *